Oct. 20, 1953  M. W. MARIEN  2,656,228
PISTON PACKING RING

Filed Feb. 12, 1951  2 Sheets-Sheet 1

INVENTOR.
MELVIN W. MARIEN,
By Harry A. Berner
ATTORNEY.

Oct. 20, 1953   M. W. MARIEN   2,656,228
PISTON PACKING RING
Filed Feb. 12, 1951   2 Sheets-Sheet 2
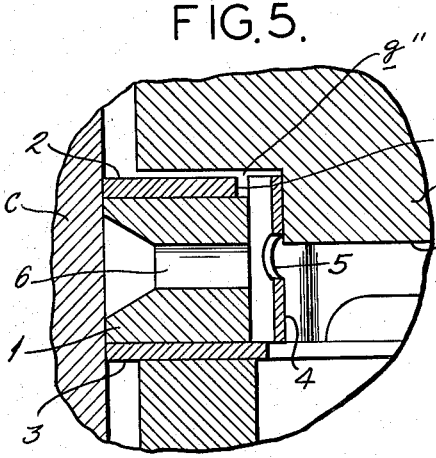
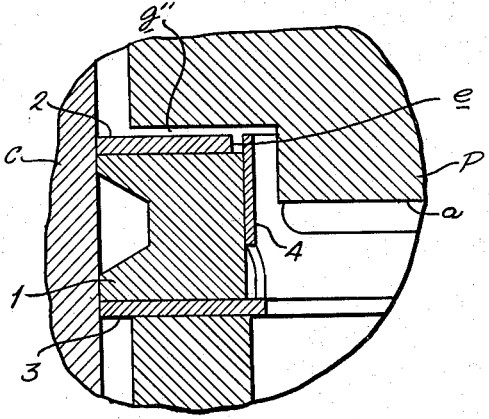
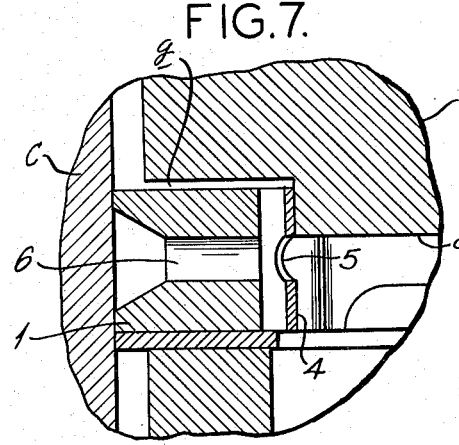
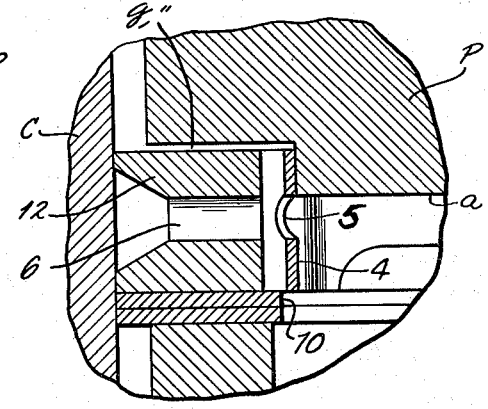
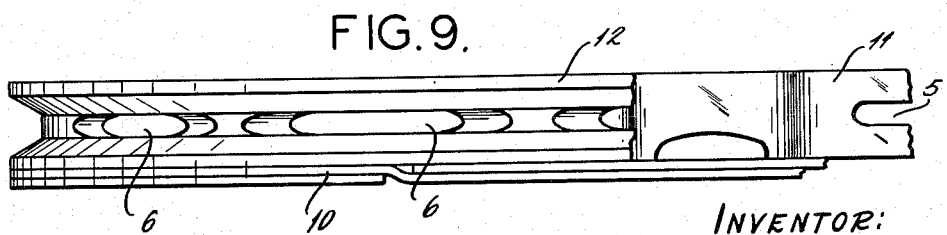
INVENTOR:
MELVIN W. MARIEN,
By Harry A. Beimer
ATTORNEY.

Patented Oct. 20, 1953

2,656,228

UNITED STATES PATENT OFFICE 2,656,228

PISTON PACKING RING

Melvin W. Marien, St. Louis, Mo., assignor to Ramsey Corporation, St. Louis, Mo., a corporation of Ohio Application February 12, 1951, Serial No. 210,535

6 Claims. (Cl. 309—7)

My invention has relation to improvements in piston packing rings and it consists in the novel features of construction more fully set forth in the specification and pointed out in the claims.

The primary object of the invention is to provide a piston ring of the type known as an oil ring especially adapted for use in piston grooves provided with circumferential drainage slots. It is a matter of common knowledge in the automotive industry that some pistons are manufactured with long drainage slots for the venting of excess oil rather than a series of oil ports. This substitution of the oil slot for the plurality of ports is largely due to economy of manufacture. Nevertheless, the provision of such slots interferes with the successful use of piston rings which employ a spring expander for the purpose of augmenting the tension of the oil ring. This matter will be brought out more clearly hereinafter.

Figure 1:
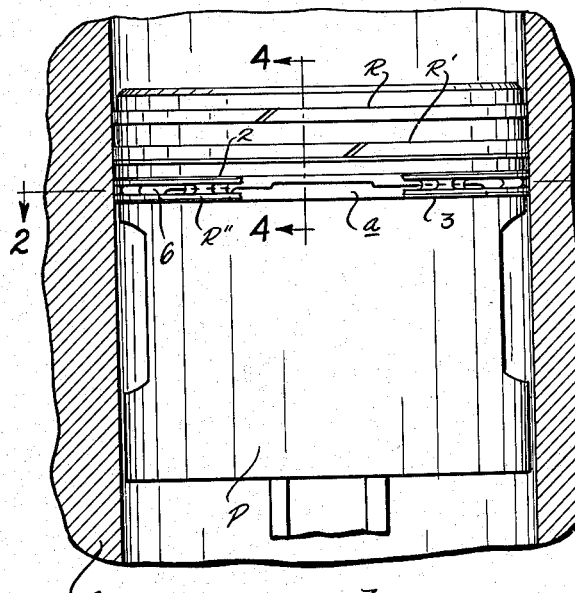
Figure 4:
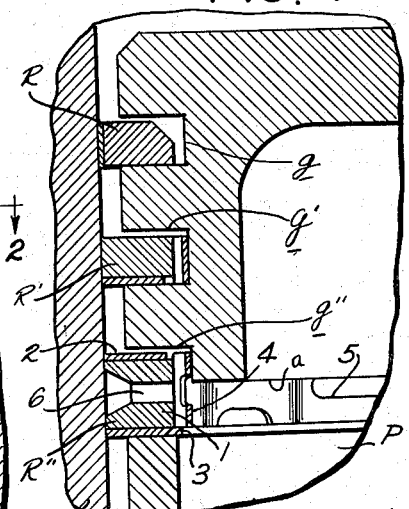
Figure 2:
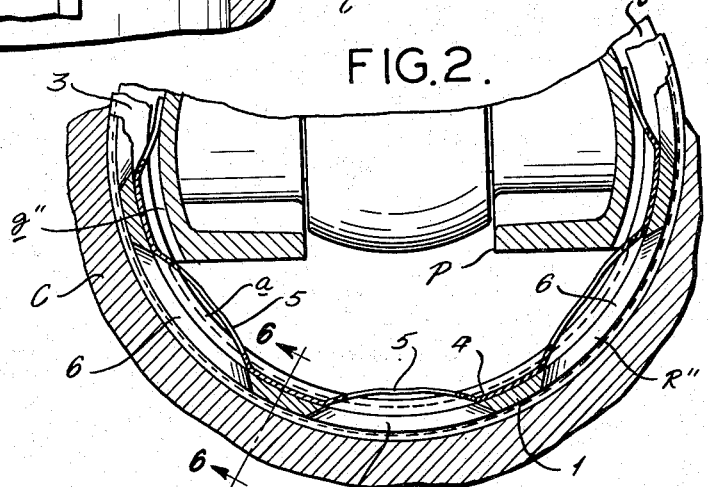
Figure 3:
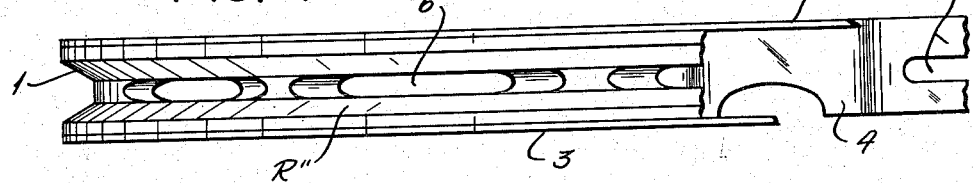

The principal object of the present invention is, therefore, the provision of a piston ring which embodies a special element to serve as a supporting shelf for the spring expander to prevent the expander from slipping into the oil drainage slot and thus become inoperative. This object together with other advantages inherent in the invention will be better apparent from a detailed description thereof in connection with the accompanying drawings, in which:

Fig. 1 is a side elevation of a commonly used type of piston shown in an engine cylinder (in section); Fig. 2 is a fragmentary cross-section taken on the line 2—2 of Fig. 1; Fig. 3 is a side elevation of my improved piston packing ring with parts broken away; Fig. 4 is a cross-section through the piston head taken on the line 4—4 of Fig. 1; Fig. 5 is an enlarged cross-section of the lower ring groove similar to the section in Fig. 4; Fig. 6 is a cross-section taken on a plane indicated by the line 6—6 in Fig. 2; Fig. 7 is a section similar to that of Fig. 5 showing a modified form of the invention; Fig. 8 is a further modified form of the invention; and Fig. 9 is a side elevation of the ring shown in Fig. 8 with parts broken away.

Referring to the drawings, P represents a piston mounted for operation within cylinder C. The piston P is provided with piston ring grooves $g$, $g'$ and $g''$ in the ring flange of the head thereof. The grooves $g$ and $g'$ have rings R and R' mounted within them which are of the ordinary compression type construction and form no part of the subject matter of the present invention. The present invention is directed specifically to the oil type ring R'' mounted in groove $g''$ in the bottom of the ring flange and top of the adjoining piston skirt. This groove $g''$ is provided with oppositely disposed oil drainage slots $a$ (only one of which shows in the drawing). As shown in Figures 4 to 8, these slots provide open gaps not only in the back wall of the oil ring groove $g''$ but also in the bottom of this groove, since the adjacent piston skirt has its inner face outwardly from the back wall of the groove.

By referring to Figs. 1, 2 and 5 it will be seen that the oil slot $a$ extends a substantial distance around the bottom of groove $g''$, making it impossible to use a spring expander (or inner ring) with the ordinary type of oil ring. If the usual ring construction embodying a spring expander were inserted in groove $g''$ it would collapse into the oil slot $a$ and become useless. In fact, it might even be broken up within the groove and cause considerable damage to the engine piston and cylinder. I have overcome this difficulty by providing a special type of oil ring embodying a cast iron split ring element 1 and two relatively thin steel ring sections 2 and 3 disposed against the side faces of the cast iron element 1 as shown clearly in Fig. 5. It will be observed that the radial depth of the section 3 is substantially greater than that of section 2, the purpose of which is to form a supporting shelf for the spring expander 4 of groove $g''$. The spring expander 4 exerts its spring tension solely against the cast iron spring element 1, being spaced from the inside edge $e$ of section 2 as clearly shown in Fig. 5. The functions of the respective ring elements 1, 2 and 3 are substantially the same as they are in other rings of this type embodied in grooves which are not provided with circumferential drainage slots, such as shown in Pat. No. 2,245,992. However, in the present invention the ring section 3 subserves the additional function of a supporting shelf for the expander 4 as pointed out above. The expander 4 is provided with oil drainage slots 5 so as to permit free passage of excess oil through oil slots 6 in ring 1 and slot $a$ in the bottom of groove $g''$.

The expander, or inner ring 4, is of the general type shown in my Pat. No. 1,869,108, although any oil-vented type of expander may be used.

In the construction shown in Fig. 7 the upper steel section shown as element 2 in Fig. 5 is dispensed with. This simplifies the construction but reduces the efficiency of the ring somewhat after it has had considerable wear. In the construction of Fig. 5 the expander 4 contacts the element 2 after the ring element 1 has been worn down to eliminate the clearance between edge e and the expander 4. The expander pressure thus augments the pressure of the steel section z on the cylinder wall.

In the construction shown in Figs. 8 and 9 the supporting shelf 10 is a two coil helix operating to expand against the cylinder wall thus serving as an oil-scraping ring element as well as a supporting shelf for the expander 11. The combination of cast iron ring element 12 and helical steel element 10 is well known in the art but, to my knowledge, the supporting shelf feature is new.

Having described my invention, I claim:

1. In a piston having a head with a ring flange and a thinner depending skirt on the ring flange, compression ring grooves in the ring flange, an oil ring groove at the junction of the ring flange and skirt, and said oil ring groove having a radial top wall in the ring flange, an axial back wall in the ring flange at the inner end of the top wall, a radial bottom wall in the skirt terminating radially outwardly from the back wall, said back wall terminating above the bottom wall to cooperate therewith in defining an open bottomed slot in the lower portion of the inner end of the oil groove, an oil ring in said oil ring groove, a bottom ring in said oil ring groove between the oil ring and said bottom wall of the groove and projecting radially into the open bottom of the gap, and an expander ring in the groove behind the oil ring bottomed on said back wall to expand the oil ring and supported on the portion of the bottoming ring which projects into the open bottom of the gap to be carried thereby.

2. In a hollow piston having a slotted oil ring groove with radial top and bottom walls and an axial back wall, the lower portion of the back wall and the inner portion of the bottom wall being cut away around most of the circumference thereof to provide an open bottomed slot through the back of the groove for freely joining the groove with the interior of the piston, an oil ring in said groove of less radial depth than said groove, an expander ring in said groove behind the oil ring, said expander ring being bottomed on the upper portion of the back wall of the groove and depending into said slot, and a bottoming ring in the groove extending under both rings to project into the open bottom of the slot for supporting the expander ring to prevent the expander ring from dropping into the interior of the piston.

3. In a piston and ring assembly including a piston having a slotted oil ring groove of the type wherein the back wall of the groove is radially inward from the bottom wall of the groove and has an open bottomed slot in the lower portion thereof, a split metal annulus in said groove, an expander ring behind said annulus bottomed on the back wall of the groove and depending therefrom into the slot, and a bottoming ring in the groove between the annulus and bottom wall of the groove projecting under the expander ring to support the ring and prevent the ring from dropping into the interior of the piston through the slot.

4. In combination with a piston having a groove with the back and bottom walls thereof providing an open bottomed gap joining the groove with the interior of the piston, a piston ring in said groove having oil ports around its circumference registering with said gap, a spring expander in said groove between the bottom of the groove and said piston ring, and a supporting shelf ring in the groove below the piston ring and projecting inwardly therefrom under the expander ring to support the expander ring against dropping through the open bottom of the gap into the interior of the piston.

5. In combination with a piston having a slotted open bottomed groove in the back wall thereof, a piston ring in said groove, a second ring in said groove having a radial depth less than said piston ring and lying between the top of the groove and the top of the piston ring, a third ring in the groove between the bottom of the piston ring and the bottom of the groove having a radial depth greater than the piston ring and projecting into the bottom of the slot, an expander ring in the groove behind the piston ring and second ring and supported on the projecting portion of the third ring, said expander ring acting on said piston ring alone until the piston ring wears down to the radial depth of the second ring and said expander ring then being effective to act on both the piston ring and the second ring for urging both rings outwardly while continually supported by said third ring.

6. In combination with a piston having a slotted oil ring groove providing an open bottomed gap joining the back of the groove with the interior of the piston, an oil ring in said groove, an expander ring in said groove behind said oil ring, said expander ring having oil vents coacting with said oil ring to permit free drainage of oil through the gap in the groove, and a supporting shelf in said groove projecting under both rings to maintain the expander in the groove.

MELVIN W. MARIEN.

References Cited in the file of this patent

UNITED STATES PATENTS

| Number | Name | Date |
|---|---|---|
| 2,068,114 | Solenberger | Jan. 19, 1937 |
| 2,197,983 | Phillips | Apr. 23, 1940 |
| 2,250,062 | Hellman | July 22, 1941 |
| 2,285,530 | Phillips | June 9, 1942 |
| 2,287,707 | Phillips | June 23, 1942 |
| 2,297,104 | Johnson | Sept. 29, 1942 |